United States Patent
Kume et al.

(10) Patent No.: US 10,434,895 B2
(45) Date of Patent: Oct. 8, 2019

(54) POWER SUPPLY DEVICE AND TRANSPORT APPARATUS

(71) Applicant: HONDA MOTOR CO., LTD., Tokyo (JP)

(72) Inventors: Yasuhisa Kume, Saitama (JP); Kanae Okuma, Saitama (JP); Kenta Sugitate, Saitama (JP); Christopher Lang, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 161 days.

(21) Appl. No.: 15/630,359

(22) Filed: Jun. 22, 2017

(65) Prior Publication Data
US 2017/0368947 A1 Dec. 28, 2017

(30) Foreign Application Priority Data
Jun. 23, 2016 (JP) .................. 2016-124615

(51) Int. Cl.
*B60L 53/12* (2019.01)
*H02J 50/10* (2016.01)
(Continued)

(52) U.S. Cl.
CPC .............. *B60L 53/12* (2019.02); *B60L 50/66* (2019.02); *B60L 53/22* (2019.02); *B60L 58/26* (2019.02);
(Continued)

(58) Field of Classification Search
CPC .......... B60L 53/22; B60L 50/66; B60L 58/26; B60L 2210/30; B60L 2240/545;
(Continued)

(56) References Cited

U.S. PATENT DOCUMENTS 9,428,059 B2 * 8/2016 Galamb ................ B60L 3/0046
2013/0181667 A1 7/2013 Takeshita et al.
(Continued)

FOREIGN PATENT DOCUMENTS

CN 103119669 A 5/2013
CN 103339698 A 10/2013
(Continued)

OTHER PUBLICATIONS

Feb. 20, 2018, Japanese Office Action issued for related JP Application No. 2016-124615.
(Continued)

*Primary Examiner* — Hal Kaplan
(74) *Attorney, Agent, or Firm* — Paratus Law Group, PLLC

(57) ABSTRACT

A power supply device includes: an electric storage unit; a connection unit connected to the electric storage unit; a housing which houses the electric storage unit; a power receiving unit which receives AC power in a noncontact manner; a rectifier which converts the AC power into DC power and outputs the DC power; an AC lead wire which connects the power receiving unit and the rectifier; and a DC lead wire which connects the rectifier and the connection unit. The power receiving unit is connected to the housing via a heat conduction unit, an opening is provided on a surface facing the power receiving unit in the housing, any one of the AC lead wire, the DC lead wire and the rectifier is disposed to pass through the opening, and the housing has a heat capacity larger than that of the power receiving unit.

15 Claims, 6 Drawing Sheets

(51) Int. Cl.
  *H02M 7/00*  (2006.01)
  *B60L 53/22* (2019.01)
  *B60L 50/60* (2019.01)
  *B60L 58/26* (2019.01)

(52) U.S. Cl.
  CPC ............ *H02J 50/10* (2016.02); *H02M 7/003* (2013.01); *B60L 2210/30* (2013.01); *B60L 2240/545* (2013.01); *Y02T 10/705* (2013.01); *Y02T 10/7016* (2013.01); *Y02T 10/7072* (2013.01); *Y02T 10/7241* (2013.01); *Y02T 90/127* (2013.01); *Y02T 90/14* (2013.01)

(58) Field of Classification Search
  CPC .. H02M 7/003; Y02T 10/7016; Y02T 10/705; Y02T 10/7072; Y02T 10/7241; Y02T 90/127; Y02T 90/14; H02J 50/10
  USPC ........................................................ 307/10.1
  See application file for complete search history.

(56) References Cited

U.S. PATENT DOCUMENTS

| | | |
|---|---|---|
| 2013/0181797 A1 | 7/2013 | Hickox |
| 2013/0193749 A1 | 8/2013 | Nakamura et al. |
| 2014/0084697 A1 | 3/2014 | Yasuda et al. |
| 2014/0320078 A1 | 10/2014 | Nakamura et al. |
| 2014/0346815 A1 | 11/2014 | Keutz et al. |
| 2015/0327405 A1 | 11/2015 | Niizuma |

FOREIGN PATENT DOCUMENTS

| | | |
|---|---|---|
| CN | 104956568 A | 9/2015 |
| EP | 0982832 A3 | 8/2000 |
| GB | 2500820 B | 11/2014 |
| JP | 2013-153132 A | 8/2013 |
| JP | 2013-154815 A | 8/2013 |
| JP | 2015-512137 A | 4/2015 |
| JP | 5825356 B2 | 12/2015 |
| JP | 2016-025008 A | 2/2016 |
| WO | WO 2015/128498 A1 | 9/2015 |

OTHER PUBLICATIONS

Jul. 23, 2019, Chinese Office Action issued for related CN Application No. 201710416262.X.

* cited by examiner

POWER SUPPLY DEVICE AND TRANSPORT APPARATUS

CROSS-REFERENCE TO RELATED APPLICATION(S)

This application claims priority from Japanese Patent Application No. 2016-124615 filed on Jun. 23, 2016, the entire contents of which are incorporated herein by reference.

TECHNICAL FIELD

The present invention relates to a power supply device equipped with a power receiving unit that receives power from a power transmitting unit in a noncontact manner, and a transport apparatus.

BACKGROUND ART

As a technique for charging a battery mounted on a vehicle such as a hybrid car or an electric car driven by an electric motor, a non-contact electric power transmission technique taking the convenience at the time of charging has attracted attention. For example. Patent Literature 1 discloses a vehicle which includes a power receiving unit that receives AC power in a non-contact manner from a power transmitting unit, a rectifier that converts the AC power received by the power receiving unit into DC power and outputs the converted DC power, and a battery that is charged with DC power rectified by the rectifier, and in which the battery is disposed above a floor panel, the power receiving unit is disposed below the floor panel, and the rectifier is disposed between the battery and the power receiving unit.

PRIOR ART LITERATURE

Patent Literature

Patent Literature 1: Japanese Patent No. 5825356

SUMMARY OF THE INVENTION

Problem that the Invention is to Solve

In order to prevent deterioration of performance due to an abnormal temperature rise, it is necessary to maintain the temperature within an appropriate range in the battery and the power receiving unit. However, in the vehicle described in Patent Literature 1, the battery and the power receiving unit are divided by the floor panel and require exclusive cooling units. Accordingly, there was a risk of increase in weight, size and cost. Further, in the non-contact electric power transmission technique, there was a risk of an occurrence of magnetic leakage due to positional deviation between the power receiving unit and the power transmitting unit.

An object of the invention is to provide a power supply device and a transport apparatus capable of omitting a cooling unit dedicated to a power receiving unit, or a power supply device and a transport apparatus capable of suppressing magnetic leakage.

Means for Solving the Problem

In order to achieve the above object, the invention provides the following aspects.

(1) A power supply device (for example, a power supply device 10 in embodiment) including:
an electric storage unit (for example, battery modules 21 to 24 in embodiment);
a connection unit (for example, a junction box 27 in embodiment) connected to the electric storage unit;
a housing (for example, a battery case 50 in embodiment) which houses the electric storage unit;
a power receiving unit (for example, a power receiving unit 30 in embodiment) which receives AC power from a power transmitting unit (for example, a power transmitting unit T in embodiment) in a noncontact manner;
a rectifier (for example, a rectifier 40 in embodiment) which converts the AC power received by the power receiving unit into DC power and outputs the DC power;
an AC lead wire (for example, an AC lead wire 41 in embodiment) which connects the power receiving unit and an input side of the rectifier; and
a DC lead wire (for example, a DC lead wire 42 in embodiment) which connects an output side of the rectifier and the connection unit,
wherein the power receiving unit is connected to the housing via a heat conduction unit (for example, a heat radiation sheet 33 in embodiment),
wherein an opening (for example, an opening 51*a* in embodiment) is provided on a surface facing the power receiving unit in the housing,
wherein any one of the AC lead wire, the DC lead wire and the rectifier is disposed to pass through the opening, and
wherein the housing has a heat capacity larger than a heat capacity of the power receiving unit.

(2) The power supply device according to (1),
wherein one of the AC lead wire and the rectifier is disposed to pass through the opening.

(3) The power supply device according to (1),
wherein the power receiving unit includes a secondary coil (for example, a secondary coil 31 in embodiment), and a coil cover (for example, a coil cover 32 in embodiment) which houses the secondary coil, and
wherein the rectifier is housed in the coil cover together with the secondary coil.

(4) The power supply device according to (3),
wherein the rectifier is disposed to pass through the opening.

(5) The power supply device according to (3) or (4),
wherein the rectifier is thermally connected to the coil cover, and
wherein the coil cover has a heat capacity larger than a heat capacity of the rectifier.

(6) The power supply device according to any one of (1) to (5),
wherein a seal member (for example, a seal member 34 in embodiment) configured to seal the opening from an outside is provided between the power receiving unit and the housing, and
wherein the seal member is provided outside the heat conduction unit when viewed from the opening.

(7) The power supply device according to any one (1) to (6),
wherein a recess (for example, a recess 51*b* in embodiment) is provided on a bottom surface of the housing,
wherein the opening is provided in the recess, and
wherein at least a part of the power receiving unit is housed in the recess.

(8) A transport apparatus (for example, a vehicle V in embodiment) including
the power supply device according to any one of (1) to (7),
wherein the power supply device is disposed below a floor panel (for example, a floor panel 3 in embodiment).

(9) A power supply device (for example, the power supply device 10 in embodiment) including:

an electric storage unit (for example, the battery modules 21 to 24 in embodiment);

a housing (for example, the battery case 50 in embodiment) which houses the electric storage unit; and a power receiving unit (for example, the power receiving unit 30 in embodiment) which receives AC power from a power transmitting unit (for example, the power transmitting unit T in embodiment) in a noncontact manner, wherein a recess (for example, a recess 51b in embodiment) is provided on a bottom surface of the housing, and wherein the power receiving unit is disposed in a vertically lower part of the recess and to at least partially overlap the recess in a plan view.

(10) The power supply device according to (9), wherein an area of the recess in the plan view is larger than an area of the power receiving unit.

(11) The power supply device according to (10), wherein at least a part of the power receiving unit is housed in the recess.

(12) The power supply device according to (11), wherein the power receiving unit is housed in the recess.

(13) The power supply device according to (12), wherein the bottom surface of the housing is substantially flush with a bottom surface of the power receiving unit.

(14) The power supply device according to any one (9) to (13), wherein an opening is provided in the recess in the housing.

(15) A transport apparatus (for example, the vehicle V in embodiment) including the power supply device according to any one of (9) to (14), wherein the power supply device is disposed below a floor panel (for example, the floor panel in embodiment).

Advantage of the Invention

According to the aspect (1), since the power receiving unit is thermally connected to the housing having a large heat capacity, a cooling unit dedicated to the power receiving unit is not required, and it is possible to reduce the weight, the size and the cost of the power supply device. Further, the heat transferred from the power receiving unit to the housing can be cooled by the cooling unit of the housing or the electric storage unit. Further, since the power receiving unit, the rectifier, and the connecting unit are electrically connected to one another via the opening of the housing facing the power receiving unit, the AC lead wire and the DC lead wire can be housed inside the power supply device.

According to the aspect (2), since one of the AC lead wire and the rectifier is disposed so as to pass through the opening of the housing, a part or the whole of the rectifier is housed in the housing in the height direction, and the space occupied by electrical components required for non-contact charging can be made thin. Also, the DC lead wire can be shortened.

According to the aspect (3), since the rectifier is housed in the coil cover together with the secondary coil, the rectifier and the secondary coil can be arranged to be close to each other, and the AC lead wire can be shortened. This makes it possible to suppress the loss of the AC lead wire due to the skin effect and to improve the charging efficiency.

According to the aspect (4), since the rectifier is disposed so as to pass through the opening of the housing, by making the electric storage unit and the rectifier overlap each other in the height direction, the height dimension of the power supply device can be set to be smaller.

According to the aspect (5), since the rectifier is thermally connected to the coil cover having a large heat capacity, the heat of the rectifier can be released to the coil cover, and a cooling unit dedicated to the rectifier is not required.

According to the aspect (6), since the seal member for sealing the opening from the outside is provided between the power receiving unit and the housing, it is possible to prevent the entry of water and foreign matter from the outside. Further, since the seal member is provided outside the heat conduction unit when viewed from the opening, it is possible to prevent the heat conduction unit from being exposed to the outside.

According to the aspect (7), since at least a part of the power receiving unit is housed in the recess of the housing, the leakage magnetic field from the power receiving unit can be protected by the housing.

According to the aspect (8), since the power supply device is disposed below the floor panel, the leakage magnetic field from the power receiving unit is shielded by the floor panel, and magnetic leakage to the vehicle interior can be suppressed.

According to the aspect (9), since the power receiving unit is disposed vertically below the recess and so as to at least partly overlap the recess in a plan view, the area of the housing shielding the leakage magnetic field increases, and the shielding function of the battery case can be improved.

According to the aspect (10), since the area of the recess is larger than the area of the power receiving unit in a plan view, it is possible to more effectively protect the leakage magnetic field from the power receiving unit with the housing.

According to the aspect (11), since at least a part of the power receiving unit overlaps the recess in the height direction, the height dimension of the power supply device can be reduced.

According to the aspect (12), since the power receiving unit is completely housed in the recess, the height dimension of the power supply device can be further reduced.

According to the aspect (13), by setting the bottom surface of the housing substantially flush with the bottom surface of the power receiving unit housed in the recess, it is possible to set the height dimension of the power supply device to the minimum.

According to the aspect (14), since the opening is provided in the recess, the leakage magnetic field can also be shielded on the inner surface (back surface) of the housing.

According to the aspect (15), since the power supply device is disposed below the floor panel, the leakage magnetic field from the power receiving unit is shielded by the floor panel, and magnetic leakage to the vehicle interior can be suppressed.

MODE FOR CARRYING OUT THE INVENTION

Figure 1:
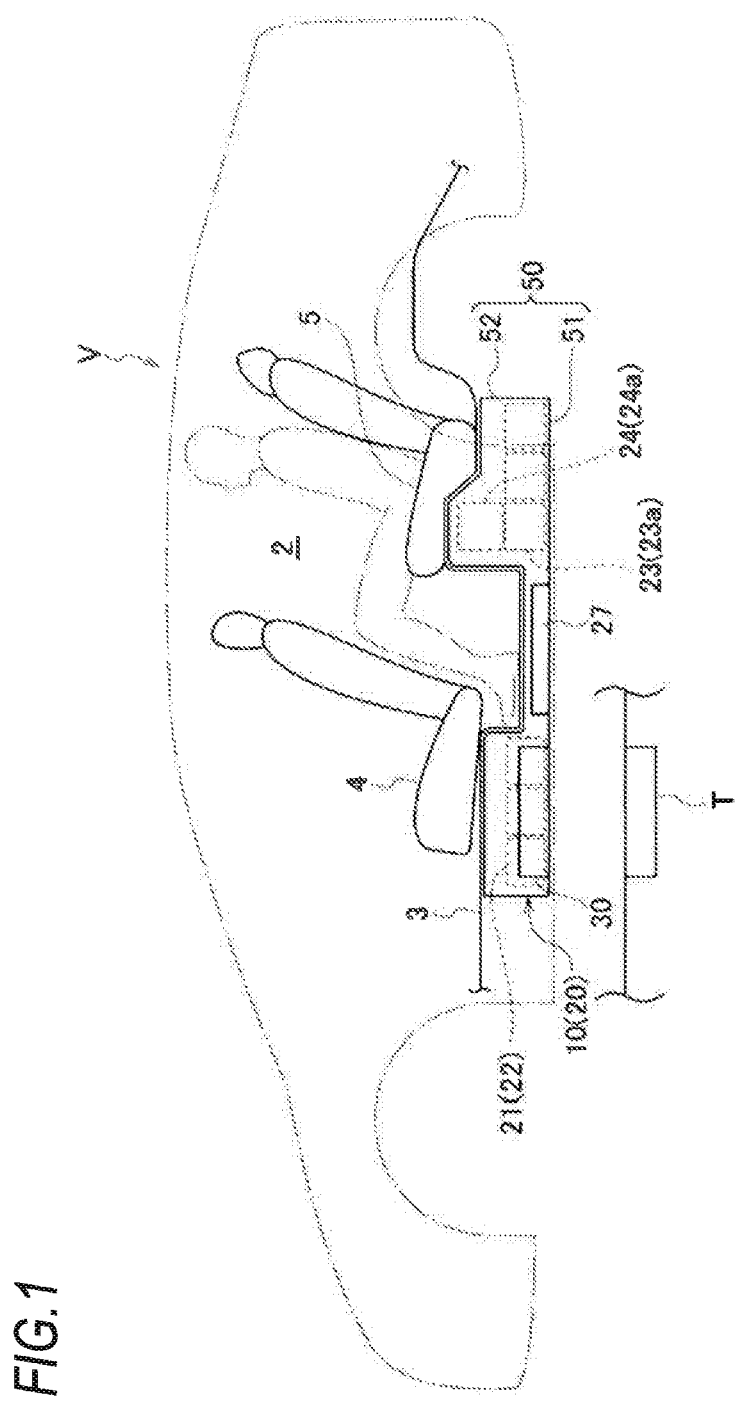
FIG. 1 is a schematic side view of a vehicle equipped with a power supply device according to an embodiment of the present invention.

Embodiments of the power supply device of the present invention will be described below with reference to the accompanying drawings. The drawings should be seen in a direction in which reference numerals given therein look proper.

Figure 2:
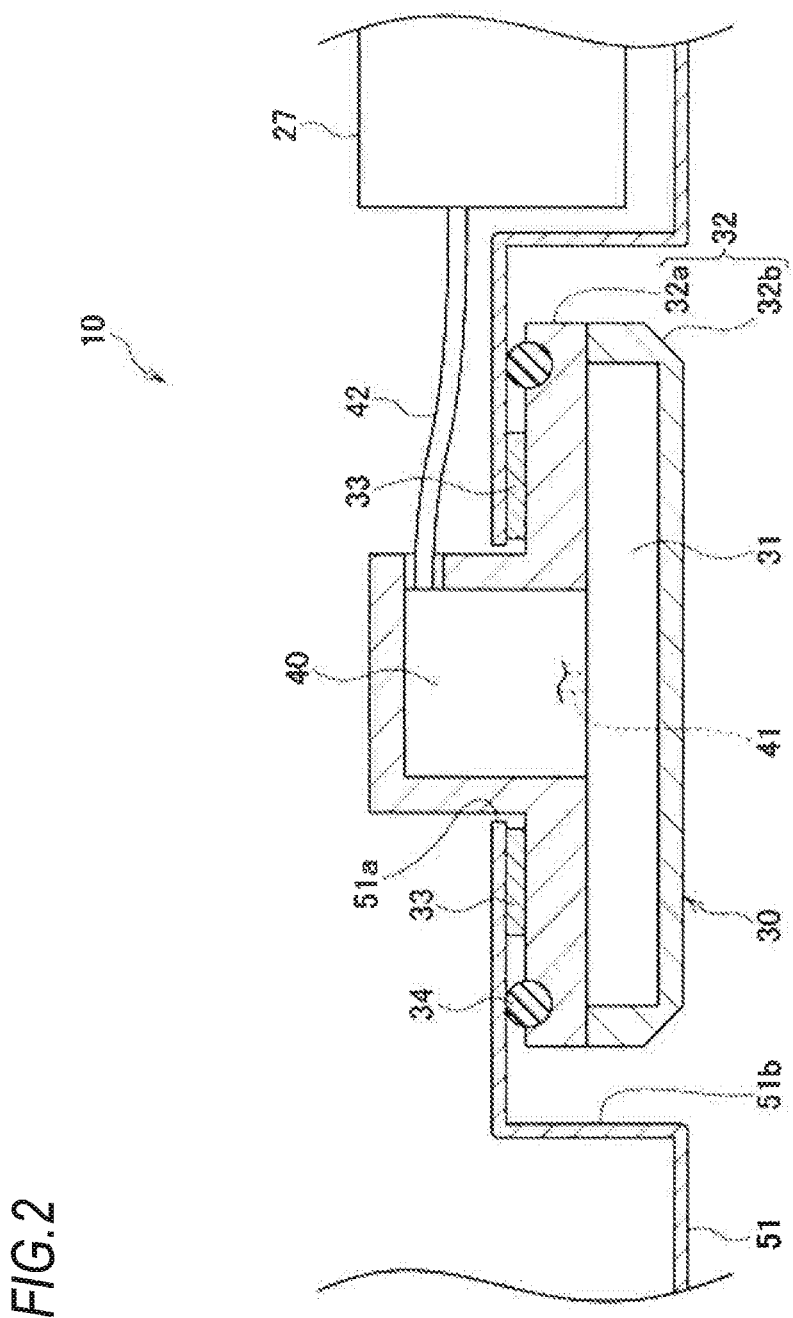
FIG. 2 is a cross-sectional view of a main part of a power supply device according to a first embodiment of the present invention as seen from a side.
Figure 3:
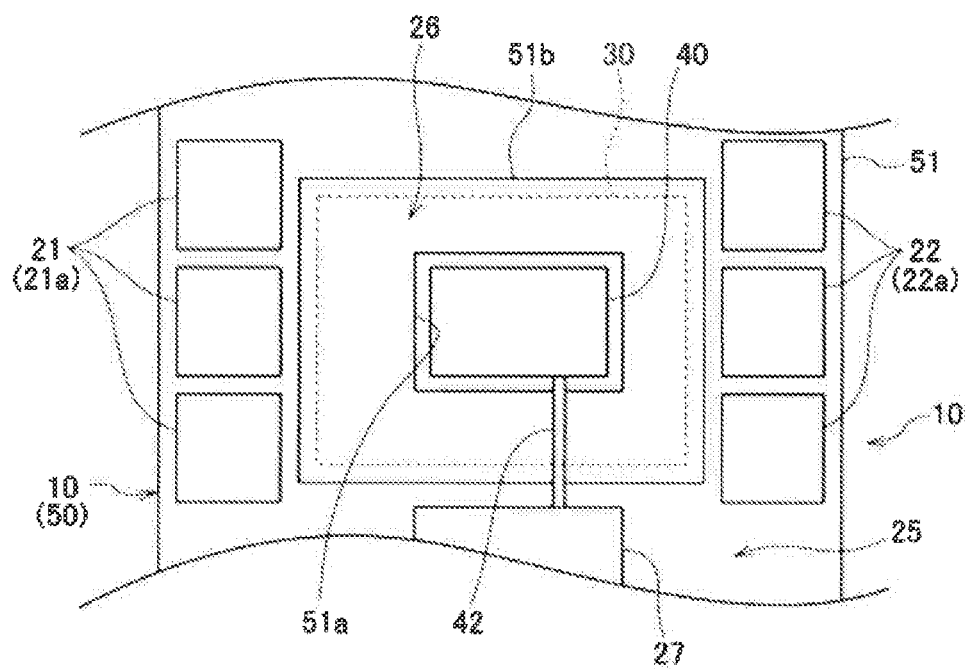
FIG. 3 is a plan view of the main part of the power supply device according to the first embodiment of the present invention as seen from the inside of the power supply device.

As illustrated in FIGS. 1 to 3, a power supply device 10 includes a battery unit 20 that houses battery modules 21 to 24, a power receiving unit 30 that receives AC power from a power transmitting unit T in a non-contact manner, and a rectifier 40 that converts the AC power received by the power receiving unit 30 into DC power and outputs the DC power, and is mounted on a vehicle V such as a hybrid vehicle, an electric vehicle, and a fuel cell vehicle. The vehicle V includes a floor panel 3 that forms a floor of a passenger compartment 2, and the power supply device 10 is disposed below the floor panel 3, that is, at the bottom of the vehicle V. Each constituent element of the power supply device 10 will be described below.

The battery unit 20 of the present embodiment mainly includes a plurality of battery modules 21 to 24, a junction box 27, a battery ECU (not illustrated), and a battery case 50 that houses theses elements.

The battery case 50 includes a bottom plate 51 on which the plurality of battery modules 21 to 24, the junction box 27, and a battery ECU are mounted, and a cover 52 that covers these elements from above. The bottom plate 51 of the battery case 50 is formed, at least using a material having thermal conductivity and magnetic shielding properties. Further, in the battery case 50, a plurality of brackets (not illustrated) extending in the left-right direction is fastened to a floor frame (not illustrated) disposed on both sides of the vehicle V, and thus, the battery unit 20 is mounted to be suspended below the floor panel 3.

The plurality of battery modules 21 to 24 includes two front battery modules 21 and 22 housed in the front part of the battery case 50, and two rear battery modules 23 and 24 housed in the rear part of the battery case 50 with a first space 25 interposed therebetween. Each of the battery modules 21 to 24 has a plurality of high-voltage batteries 21a to 24a.

In this embodiment, one front battery module 21 is constituted by three high-voltage batteries 21a aligned in the front-rear direction, and the other front battery module 22 is constituted by three high-voltage batteries 22a aligned in the front-rear direction. One rear battery module 23 is constituted by a total of six high-voltage batteries 23a including two in the left-right direction with three high-voltage batteries 23a aligned in the front-rear direction. The other rear battery module 24 is constituted by two high-voltage batteries 24a disposed in the left-right direction. The two front battery modules 21 and 22 are housed in the front part of the battery case 50 in a state of being distributed to the left and right with the second space 26 interposed therebetween.

The plurality of battery modules 21 to 24 is disposed below the front seat 4 and the rear seat 5 of the vehicle V (see FIG. 1). Specifically, the front battery modules 21 and 22 are disposed below the front seat 4, and the rear battery modules 23 and 24 are disposed below the rear seat 5.

The junction box 27 is a box body which houses a plurality of terminals used when coupling, branching and relaying the lead wires, and a safety device such as a fuse and a breaker, and is disposed in the first space 25 between the front battery modules 21 and 22 and the rear battery modules 23 and 24 when viewed in a side, and at the center in the width direction of the battery unit 20.

The battery unit 20 is provided with a battery cooling unit (not illustrated) for maintaining the temperature of the battery modules 21 to 24 within an appropriate range in order to prevent performance deterioration of the battery modules 21 to 24 due to an abnormal temperature rise. For example, an air cooling type battery cooling unit is provided which cools the battery modules 21 to 24 with air introduced from the cooling fan (not illustrated) into the battery case 50 and discharges the cooled air to the outside of the battery case 50. Further, the battery cooling unit is not limited to the air cooling type, and may be a water cooling type or an oil cooling type.

The power receiving unit 30 includes a secondary coil 31, and a coil cover 32 that houses the secondary coil 31. The power receiving unit 30 is disposed at the bottom of the power supply device 10 and at the bottom of the vehicle V, and receives the AC power transmitted from the external power system via the primary coil (not illustrated) of the power transmitting unit, using a non-contact electric power transmission technique. Specifically, when the primary coil of the power transmitting unit T is AC-excited in a state in which the power receiving unit 30 faces thereto, AC current flows through the secondary coil 31 of the power receiving unit 30 by the action of electromagnetic induction. At this time, an AC magnetic field is generated between the power transmitting unit T and the power receiving unit 30, and a part thereof becomes a leakage magnetic field.

The rectifier 40 has a rectifier circuit which converts the input AC power into DC power and outputs the DC power, an input side thereof is connected to the power receiving unit 30 via an AC lead wire 41, and an output side thereof is connected to the junction box 27 via a DC lead wire 42. As a result, the power received by the power receiving unit 30 is input to the rectifier 40 via the AC lead wire 41, is converted from AC power to DC power here, and then is supplied to the battery modules 21 to 24 via the DC lead wire 42 and the junction box 27. Like the battery modules 21 to 24, the power receiving unit 30 and the rectifier 40 are required to maintain the temperature within an appropriate range in order to prevent performance deterioration due to an abnormal temperature rise.

In the AC lead wire 41, the power transmission efficiency (loss) varies according to the frequency of the AC current flowing therethrough. Specifically, the AC current flowing through the AC lead wire 41 concentrates mainly on the skin side of the AC lead wire 41 due to the skin effect, and as the frequency becomes higher, the depth of skin through which most of the AC current flows decreases. When the flowing AC current concentrates on the skin side of the AC lead wire 41, the power transmission efficiency declines due to a decrease in the effective conducting cross-sectional area caused by the current shortage near the center or the heat loss on the skin side, and as the frequency becomes higher, a decline in the power transmission efficiency becomes remarkable. Furthermore, as the skin effect increases, the leakage magnetic field to the surroundings cannot be ignored. Therefore, in the non-contact transmission in which the high frequency band is selected, in order to suppress the loss due to the skin effect, it is desirable to make the AC lead wire 41 as short as possible.

Next, the arrangement of the power receiving unit 30 and the rectifier 40 in the power supply device 10 will be described.

The rectifier 40 is disposed close to the center of the upper surface of the secondary coil 31 of the power receiving unit 30, and is housed in a coil cover 32 made up of an upper coil cover 32a and a lower coil cover 32b together with the secondary coil 31. As a result, the AC lead wire 41 becomes short, and the loss due to the skin effect and the leakage magnetic field are suppressed. Further, the rectifier 40 is thermally connected to the coil cover 32 having thermal conductivity and having a heat capacity larger than that of the rectifier 40. This makes it possible to cool the rectifier 40, using a cooling unit of the power receiving unit 30.

The power receiving unit 30 is disposed on the lower surface side of the bottom plate 51 of the battery case 50. On the bottom plate 51, an opening 51a is provided on a surface facing the power receiving unit 30, and the rectifier 40 is disposed to pass through the opening 51a. Therefore, it is possible to make the battery unit 20 and the rectifier 40 overlap in the height direction, and to suppress the height dimension of the power supply device 10.

On the upper surface of the coil cover 32 of the power receiving unit 30, a heat radiation sheet 33 is disposed so as to surround the rectifier 40. The coil cover 32 is thermally connected to the bottom plate 51 having thermal conductivity and having a larger heat capacity than the power receiving unit 30 via the heat radiation sheet 33. This makes it possible to cool the power receiving unit 30 and the rectifier 40, using the cooling unit of the battery unit 20.

Between the coil cover 32 of the power receiving unit 30 and the bottom plate 51 of the battery case 50, a seal member 34 which seals the opening 51a from the outside to prevent entry of water and foreign matter from the outside into the battery case 50 is provided. The seal member 34 is provided to surround the outside of the heat radiation sheet 33 as viewed from the opening 51a, and also prevents the heat radiation sheet 33 from being exposed to the outside.

The bottom plate 51 of the battery case 50 is provided with a downward opening recess 51b in which an area of the recess 51b in a plan view is larger that an area of the power receiving unit 30 in a plan view. Specifically, the recess 51b is provided in the battery case 50 so as to protrude into the second space 26 secured between the left and right front battery modules 21 and 22. The opening 51a is formed in the central portion of the recess 51b in a plan view, and the power receiving unit 30 is disposed vertically below the recess 51b and so as to overlap the recess 51b in the plan view. According to such a configuration of the recess 51b, since the surface area of the bottom plate 51 is increased in the vicinity of the power receiving unit 30 in which the leakage magnetic field is generated, it is possible to improve the magnetic shield function of the bottom plate 51.

More specifically, the power receiving unit 30 is disposed inside the recess 51b such that the bottom surface of the battery case 50 and the bottom surface of the power receiving unit 30 substantially flush with each other, in other words, the bottom surface of the battery case 50 and the bottom surface of the power receiving unit 30 form the same plane. In this way, it is possible to make the power receiving unit 30 and the recess 51b overlap in the height direction, and to set the height dimension of the power supply device 10 to the minimum. Furthermore, it is possible to protect the power receiving unit 30 from damage due to collision with protrusions or the like provided on the road surface.

As described above, according to such a configuration of the power supply device 10 of the present embodiment, since the power receiving unit 30 is thermally connected to the battery case 50 having a large heat capacity, a cooling unit dedicated to the power receiving unit is not required, and it is possible to reduce the weight, the size and the cost of the power supply device 10.

In addition, since the power receiving unit 30, the rectifier 40, and the junction box 27 are electrically connected to one another via the opening 51a of the battery case 50 opposed to the power receiving unit 30, the AC lead wire 41 and the DC lead wire 42 can be housed inside the power supply device 10.

Further, since the rectifier 40 is disposed to pass through the opening 51a of the battery case 50, a part or the whole of the rectifier 40 in the height direction is housed in the battery case 50, which makes it possible to make the space occupied by the electrical components necessary for non-contact charging thinner, and further to shorten the DC lead wire 42.

Further, since the rectifier 40 is housed in the coil cover 32 together with the secondary coil 31, the rectifier 40 and the secondary coil 31 can be arranged to be close to each other, and the AC lead wire 41 can be shortened. This makes it possible to suppress the loss of the AC lead wire 41 due to the skin effect and to improve the charging efficiency.

In addition, since the rectifier 40 is thermally connected to the coil cover 32 having a large heat capacity, the heat of the rectifier 40 can be released to the coil cover 32, and a cooling unit dedicated to the rectifier is not required.

Further, since the seal member 34 for sealing the opening 51a from the outside is provided between the power receiving unit 30 and the battery case 50, it is possible to prevent the entry of water and foreign matter from the outside. Further, since the seal member 34 is provided outside the heat radiation sheet 33 when viewed from the opening 51a, it is possible to prevent the heat radiation sheet 33 from being exposed to the outside.

Further, since the power receiving unit 30 is disposed vertically below the recess 51b provided at the bottom of the battery case 50 and so as to at least partly overlap the recess 51b in a plan view, the area of the battery case 50 shielding the leakage magnetic field increases, and the shielding function of the battery case 50 can be improved.

Further, since the area of the recess 51b is larger than the area of the power receiving unit 30 in a plan view, it is possible to more effectively protect against the leakage magnetic field from the power receiving unit 30 with the housing.

Further, since the power receiving unit 30 is completely housed in the recess 51b, the height dimension of the power supply device 10 can be reduced.

Further, by setting the bottom surface of the battery case 50 to substantially flush with the bottom surface of the power receiving unit 30 housed in the recess 51b, it is possible to set the height dimension of the power supply device 10 to the minimum.

In addition, since the opening 51a is provided in the recess 51b, the leakage magnetic field can also be shielded on the inner surface (back surface) of the battery case 50.

Further, since the power supply device 10 is disposed below the floor panel 3, the leakage magnetic field from the power receiving unit 30 is shielded by the floor panel 3, and magnetic leakage to the vehicle interior 2 can be suppressed.

Next, power supply devices 10B to 10D according to second to fourth embodiments of the present invention will be described with reference to FIGS. 4 to 6. However, by using the same reference numerals as those of the first embodiment for the configurations common to those of the first embodiment, the description of the first embodiment is incorporated.

Figure 4:
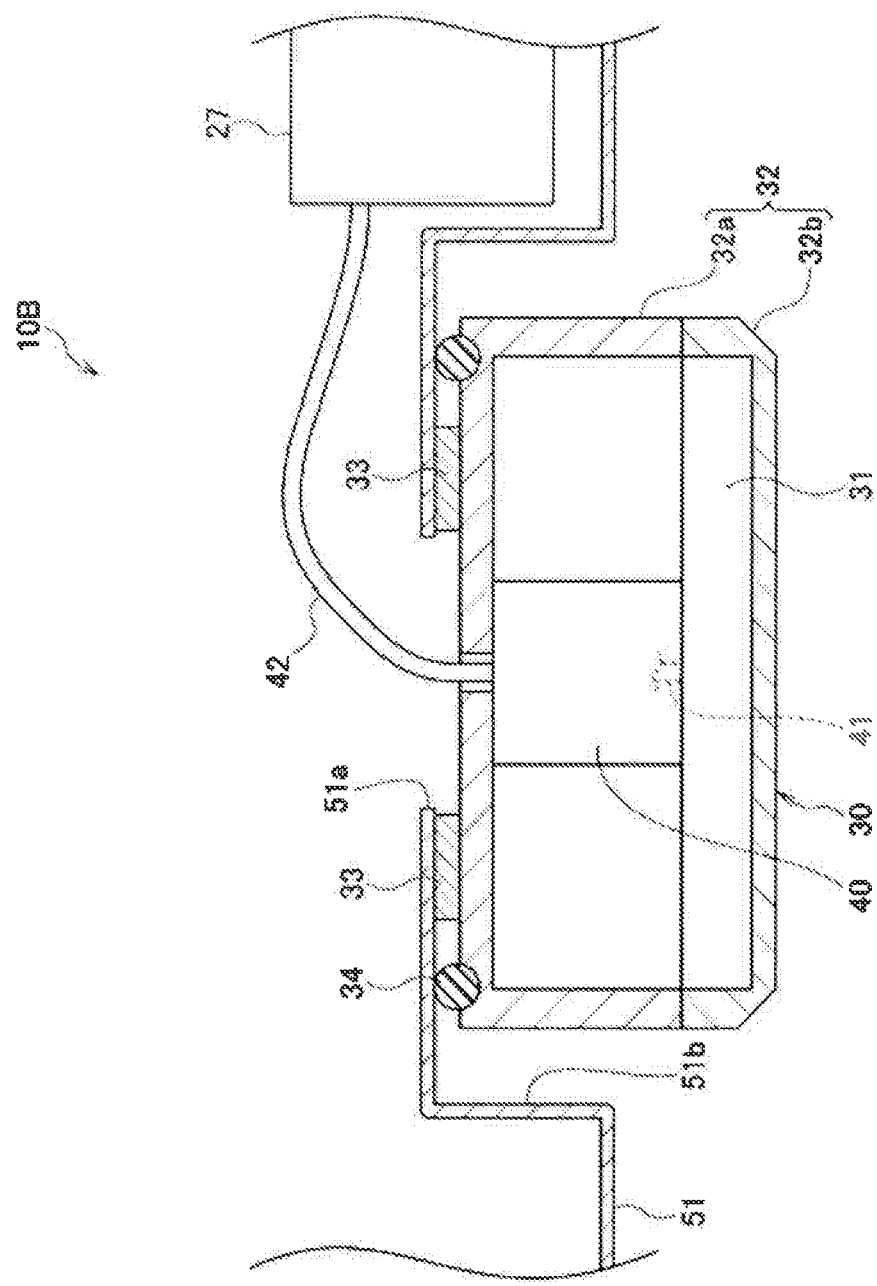
FIG. 4 is a cross-sectional view of a main part of a power supply device according to a second embodiment of the present invention as seen from the side.

As illustrated in FIG. 4, the power supply device 10B of the second embodiment is different from the aforementioned embodiment in that the power receiving unit 30 and the rectifier 40 are disposed such that the DC lead wire 42 passes through the opening 51a. Even in the power supply device 10B of the second embodiment configured as described above, similarly to the power supply device 10 of the first embodiment, it is possible to attain cooling of the power receiving unit 30 and the rectifier 40 using the battery cooling unit, minimization of the AC lead wire 41, and improvement in the magnetic shield function using the battery case 50.

Figure 5:
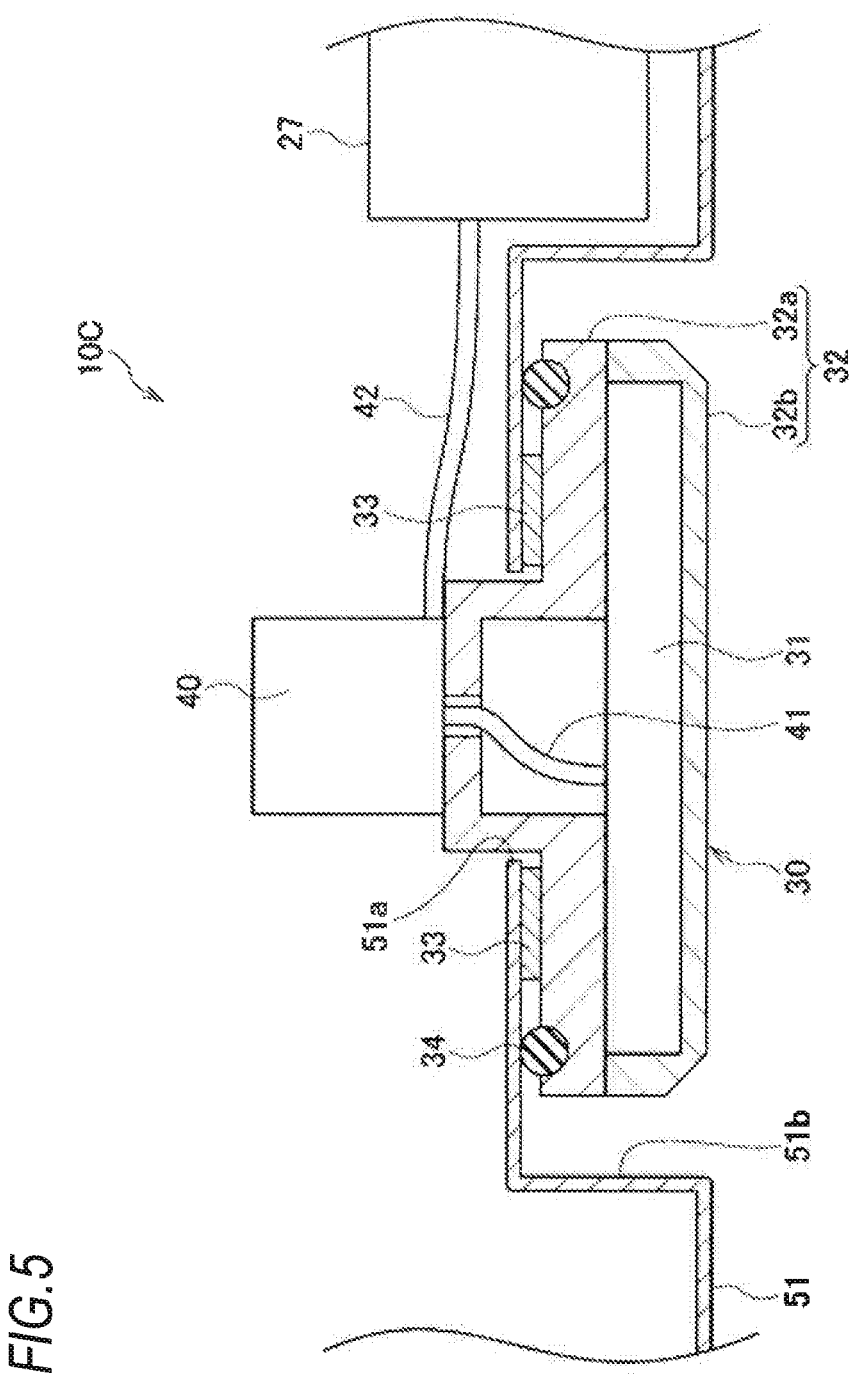
FIG. 5 is a cross-sectional view of a main part of a power supply device according to a third embodiment of the present invention as seen from the side.

As illustrated in FIG. 5, the power supply device 10C of the third embodiment is different from the aforementioned embodiment in that the power receiving unit 30 and the rectifier 40 are arranged such that the AC lead wire 41 passes through the opening 51a. Even in the power supply device 10C according to the third embodiment configured as described above, similarly to the power supply device 10 of the first embodiment, it is possible to attain cooling of the power receiving unit 30 and the rectifier 40 using the battery cooling unit, improvement in the magnetic shield function using the battery case 50, and minimization of the height dimension of the power supply device 10C.

Figure 6:
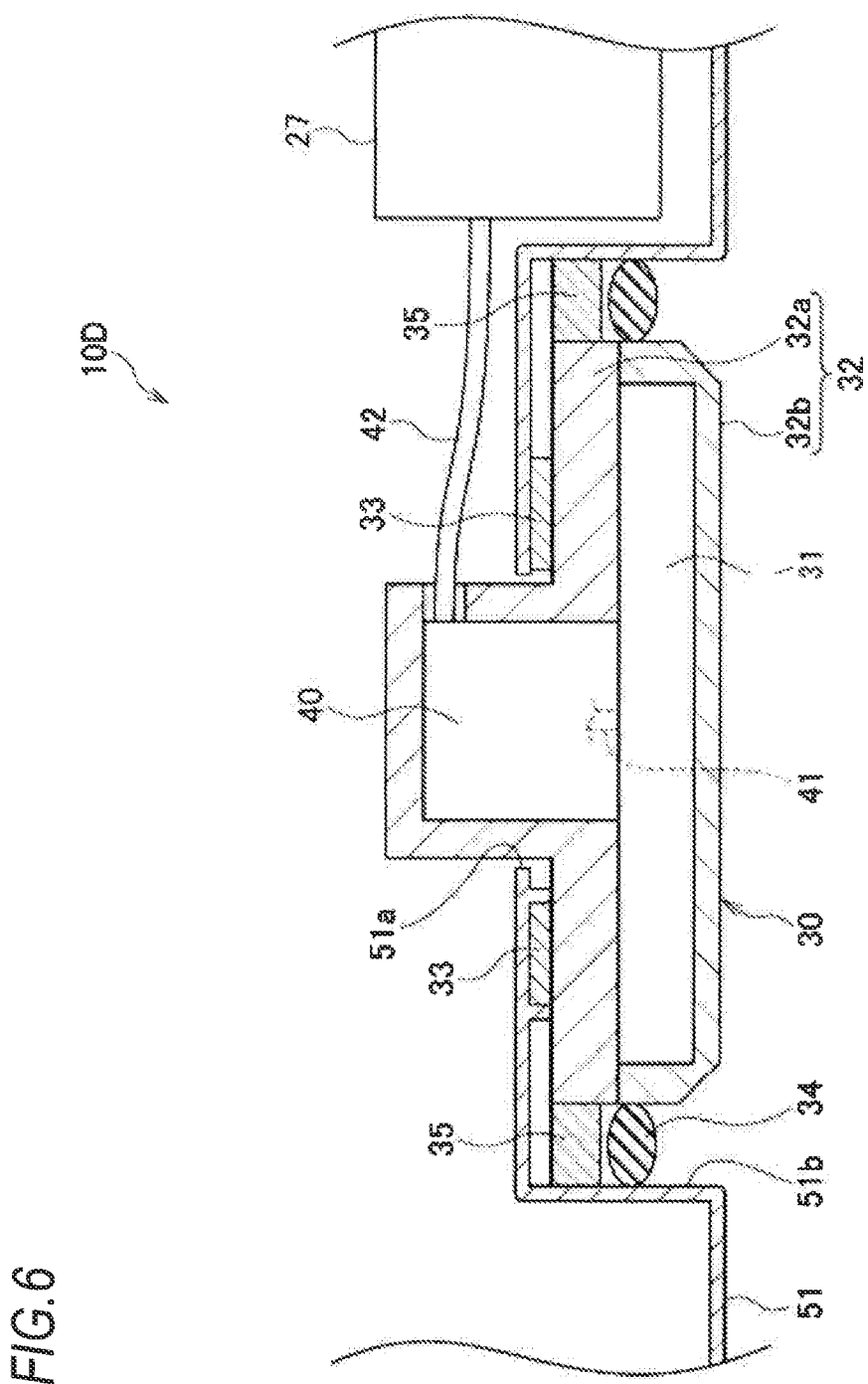
FIG. 6 is a cross-sectional view of a main part of a power supply device according to a fourth embodiment of the present invention as seen from the side.

As illustrated in FIG. 6, the power supply device 10D of the fourth embodiment is different from the aforementioned embodiment in that the other heat radiation sheet 35 and the seal member 34 are provided between the outer surface of the coil cover 32 and the vertical wall of the recess 51b. Even in the power supply device 10D of the fourth embodiment configured in this way, similarly to the power supply device 10 of the first embodiment, it is possible to attain cooling of the power receiving unit 30 and the rectifier 40 using the battery cooling unit, minimization of the AC lead wire 41, improvement in the magnetic shield function using the battery case 50, and minimization of the height dimension of the power supply device 10D.

Further, the present invention is not limited to the above-described embodiments, but may be appropriately modified, improved, and the like.

DESCRIPTION OF REFERENCE NUMERALS AND CHARACTERS

10: Power supply device
21 to 24: Battery module (electric storage unit)
27: Junction box (connection unit)
30: Power receiving unit
31: Secondary coil
32: Coil cover
33: Heat radiation sheet (heat conduction unit)
34: Sealing member
40: Rectifier
41: AC lead wire
42: DC lead wire
50: Battery case (housing)
51a: Opening
51b: Recess
V: Vehicle
T: Power transmitting unit
3: Floor panel

The invention claimed is:
1. A power supply device comprising:
an electric storage unit;
a connection unit connected to the electric storage unit;
a housing which houses the electric storage unit;
a power receiver which receives AC power from a power transmitting unit in a noncontact manner;
a rectifier which converts the AC power received by the power receiver into DC power and outputs the DC power;
an AC lead wire which connects the power receiver and an input side of the rectifier; and
a DC lead wire which connects an output side of the rectifier and the connection unit,
wherein the power receiver is connected to the housing via a heat conduction unit,
wherein an opening is provided on a surface facing the power receiver in the housing,
wherein any one of the AC lead wire, the DC lead wire and the rectifier is disposed to pass through the opening, and
wherein the housing has a heat capacity larger than a heat capacity of the power receiver.

2. The power supply device according to claim 1, wherein one of the AC lead wire and the rectifier is disposed to pass through the opening.

3. The power supply device according to claim 1, wherein the power receiver includes a secondary coil, and a coil cover which houses the secondary coil, and
wherein the rectifier is housed in the coil cover together with the secondary coil.

4. The power supply device according to claim 3, wherein the rectifier is disposed to pass through the opening.

5. The power supply device according to claim 3, wherein the rectifier is thermally connected to the coil cover, and
wherein the coil cover has a heat capacity larger than a heat capacity of the rectifier.

6. The power supply device according to claim 1, wherein a seal member configured to seal the opening from an outside is provided between the power receiver and the housing, and
wherein the seal member is provided outside the heat conduction unit when viewed from the opening.

7. The power supply device according to claim 1, wherein a recess is provided on a bottom surface of the housing,
wherein the opening is provided in the recess, and
wherein at least a part of the power receiver is housed in the recess.

8. A transport apparatus comprising the power supply device according to claim 1,
wherein the power supply device is disposed below a floor panel.

9. A power supply device comprising:
an electric storage unit;
a housing which houses the electric storage unit; and
a power receiver which receives AC power from a power transmitting unit in a noncontact manner,
wherein a recess is provided on a bottom surface of the housing, and
wherein the power receiver is disposed in a vertically lower part of the recess and to at least partially overlap the recess in a plan view.

10. The power supply device according to claim 9, wherein an area of the recess in the plan view is larger than an area of the power receiver.

11. The power supply device according to claim 10, wherein at least a part of the power receiver is housed in the recess.

12. The power supply device according to claim 11, wherein the power receiver is housed in the recess.

13. The power supply device according to claim 12, wherein the bottom surface of the housing is substantially flush with a bottom surface of the power receiver.

14. The power supply device according to claim 9, wherein an opening is provided in the recess in the housing.

15. A transport apparatus comprising the power supply device according to claim 9, wherein the power supply device is disposed below a floor panel.

* * * * *